United States Patent
Modha

(10) Patent No.: US 11,270,193 B2
(45) Date of Patent: Mar. 8, 2022

(54) SCALABLE STREAM SYNAPTIC SUPERCOMPUTER FOR EXTREME THROUGHPUT NEURAL NETWORKS

(71) Applicant: INTERNATIONAL BUSINESS MACHINES CORPORATION, Armonk, NY (US)

(72) Inventor: Dharmendra Modha, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 638 days.

(21) Appl. No.: 15/282,705

(22) Filed: Sep. 30, 2016

(65) Prior Publication Data

US 2018/0096242 A1    Apr. 5, 2018

(51) Int. Cl.
*G06N 3/063* (2006.01)
*G06N 3/04* (2006.01)

(52) U.S. Cl.
CPC ............. *G06N 3/063* (2013.01); *G06N 3/04* (2013.01); *G06N 3/049* (2013.01)

(58) Field of Classification Search
CPC ............ G06N 3/063; G06N 3/02; G06N 3/04; G06N 3/049
See application file for complete search history.

(56) References Cited

U.S. PATENT DOCUMENTS

| | | |
|---|---|---|
| 8,812,415 B2 | 8/2014 | Modha |
| 8,990,130 B2 | 3/2015 | Alvarez-Icaza Rivera et al. |
| 8,996,430 B2 * | 3/2015 | Modha ............... G06F 16/90335 706/15 |
| 9,020,867 B2 | 4/2015 | Esser et al. |
| 9,292,790 B2 | 3/2016 | Padovani et al. |
| 2012/0109866 A1 * | 5/2012 | Modha ................... G06N 3/088 706/28 |
| 2012/0259804 A1 * | 10/2012 | Brezzo ..................... G06N 3/04 706/25 |
| 2013/0073497 A1 * | 3/2013 | Akopyan ............... G06N 3/049 706/27 |

(Continued)

FOREIGN PATENT DOCUMENTS

| | | |
|---|---|---|
| CN | 103189880 A1 | 7/2013 |
| CN | 104641385 A | 5/2015 |

(Continued)

OTHER PUBLICATIONS

A. Amir et al., "Cognitive computing programming paradigm: A Corelet Language for composing networks of neurosynaptic cores," The 2013 International Joint Conference on Neural Networks (IJCNN), Dallas, TX, 2013, pp. 1-10. (Year: 2013).*

(Continued)

*Primary Examiner* — Kamran Afshar
*Assistant Examiner* — Randall K. Baldwin
(74) *Attorney, Agent, or Firm* — Erik A. Huestis; Stephen J. Kenny; Foley Hoag, LLP

(57) ABSTRACT

A scalable stream synaptic supercomputer for extreme throughput neural networks is provided. The firing state of a plurality of neurons of a first neurosynaptic core is determined substantially in parallel. The firing state of the plurality of neurons is delivered to at least one additional neurosynaptic core substantially in parallel.

22 Claims, 9 Drawing Sheets

(56) References Cited

U.S. PATENT DOCUMENTS

| | | | |
|---|---|---|---|
| 2014/0032465 A1 | 1/2014 | Modha | |
| 2014/0114893 A1* | 4/2014 | Arthur | G06N 3/049 706/25 |
| 2015/0058268 A1* | 2/2015 | Modha | G06F 16/90335 706/27 |
| 2015/0106306 A1 | 4/2015 | Birdwell et al. | |
| 2015/0262057 A1* | 9/2015 | Modha | G06N 3/063 706/29 |
| 2016/0004961 A1 | 1/2016 | Appuswamy et al. | |
| 2016/0086075 A1* | 3/2016 | Alvarez-Icaza Rivera | G06N 3/06 706/25 |
| 2016/0132767 A1* | 5/2016 | Alpert | G06N 3/063 706/29 |
| 2016/0132769 A1* | 5/2016 | Alpert | G06N 3/10 703/14 |
| 2016/0283840 A1* | 9/2016 | Amir | G06N 3/049 |
| 2019/0318224 A1* | 10/2019 | Lipasti | G06N 3/08 |

FOREIGN PATENT DOCUMENTS

| | | |
|---|---|---|
| JP | H0652132 A | 2/1994 |
| JP | 2015167019 A | 9/2015 |
| WO | 2013/174437 A1 | 11/2013 |

OTHER PUBLICATIONS

Cassidy, Andrew S., et al. "Cognitive computing building block: A versatile and efficient digital neuron model for neurosynaptic cores." The 2013 International Joint Conference on Neural Networks (IJCNN). IEEE, 2013. (Year: 2013).*

Esser, Steve K., et al. "Cognitive Computing Systems: Algorithms and Applications for Networks of Neurosynaptic Cores." The 2013 International Joint Conference on Neural Networks (IJCNN). IEEE, 2013, pp. 1-10 (Year: 2013).*

Amir, Arnon et al., "Cognitive computing programming paradigm: A Corelet Language for composing networks of neurosynaptic cores," The 2013 International Joint Conference on Neural Networks (IJCNN), Dallas, TX, 2013, pp. 1-10. (Year: 2013) (Year: 2013).*

Hasan, Raqibul, Tarek Taha, and Md Zahangir Alom. "A reconfigurable low power high throughput streaming architecture for big data processing." arXiv preprint https://arxiv.org/abs/1603.07400v1 arXiv:1603.07400v1 (Mar. 2016): 1-11 (Year: 2016).*

Preissl et al. "Compass: A scalable simulator for an architecture for cognitive computing." SC'12: Proceedings of the International Conference on High Performance Computing, Networking, Storage and Analysis. IEEE, 2012: 1-11 (Year: 2012).*

Cassidy et al. "Real-time scalable cortical computing at 46 gigasynaptic OPS/watt with ~100× speedup in time-to-solution and~100,000× reduction in energy-to-solution." SC'14: Proceedings of the International Conference for High Performance Computing, Networking, Storage and Analysis. IEEE:27-38 (Year: 2014).*

Akopyan, Filipp, et al. "Truenorth: Design and tool flow of a 65 mw 1 million neuron programmable neurosynaptic chip." IEEE transactions on computer-aided design of integrated circuits and systems 34.10 (2015): 1537-1557. (Year: 2015).*

Imam, Nabil, et al. "A digital neurosynaptic core using event-driven qdi circuits." 2012 IEEE 18th International Symposium on Asynchronous Circuits and Systems. IEEE, 2012: 25-32 (Year: 2012).*

Minkovich, Kirill, et al. "Programming time-multiplexed reconfigurable hardware using a scalable neuromorphic compiler." IEEE transactions on neural networks and learning systems 23.6 (2012): 889-901. (Year: 2012).*

Cruz-Albrecht, Jose M., Timothy Derosier, and Narayan Srinivasa. "A scalable neural chip with synaptic electronics using CMOS integrated memristors." Nanotechnology 24.38 (2013): 384011. (Year: 2013).*

Merolla, Paul A., et al. "A million spiking-neuron integrated circuit with a scalable communication network and interface." Science 345.6197 (2014): 668-673. (Year: 2014).*

Esser, Steven K., et al. "Convolutional Networks for Fast, Energy-Efficient Neuromorphic Computing." Proceedings of the National Academy of Sciences rn 1: 0 (Mar. 28, 2016):1-7 (Year: 2016).*

International Search Report and Written Opinion for International Application No. PCT/IB2017/055830 dated Jan. 15, 2018.

Hasan, R., Taha, T., & Alom, Z. (2016). A Reconfigurable Low Power High Throughput Streaming Architecture for Big Data Processing. arXiv preprint arXiv:1603.07400.

Sharp, T., Galluppi, F., Rast, A. et al. (2012). Power-efficient simulation of detailed cortical microcircuits on SpiNNaker. Journal of neuroscience methods, 210(1), 110-118.

Lettnin et al., "Synthesis of Embedded System C Design: A Case Study of Digital Neural Networks," Proceedings of the Design, Automation and Test in Europe Conference and Exhibition Designers' Forum IEEE, Tübingen University, (6 pages) (2004).

English Translation of Japanese Office Action for IBI-07201 dated Mar. 5, 2021.

United Kingdom Examination Report for GB Application No. 1904766.1 dated Jun. 21, 2021.

UK Office Action Response for GB Application No. 1904766.1 dated Aug. 9, 2021.

Krikelis, "A novel massively associative processing architecture for the implementation of artificial neural networks," Proceedings of 1991 International Conference on Acoustics, Speech, and Signal Processing (ICASSP 91), IEEE, 1057-1060 (1991).

Notice of Reasons for Refusal for Japanese Patent Application No. 2019-514276 dated Nov. 5, 2021.

Vainbrand et al., "Scalable network-on-chip architecture for configurable neural networks," Microprocessors and Microsystems, 35: 152-166 (2011).

Report on Telephone Conversation for United Kingdom Application No. GB1904766.1 dated Oct. 6, 2021.

* cited by examiner

SCALABLE STREAM SYNAPTIC SUPERCOMPUTER FOR EXTREME THROUGHPUT NEURAL NETWORKS

BACKGROUND

Embodiments of the present invention relate to neuromorphic systems, and more specifically, to a scalable stream synaptic supercomputer for extreme throughput neural networks.

BRIEF SUMMARY

According to embodiments of the present disclosure, a method of and computer program product for operating a neural network are provided. The firing state of a plurality of neurons of a first neurosynaptic core is determined substantially in parallel. The firing state of the plurality of neurons is delivered to at least one additional neurosynaptic core substantially in parallel.

According to embodiments of the present disclosure, a neuromorphic system is provided. The system includes a plurality of neurosynaptic cores. The neurosynaptic cores comprise a plurality of axons, a plurality of synapses, and a plurality of neurons. An inter-core network connects the plurality of neurosynaptic cores. The inter-core network is adapted to deliver from a first neurosynaptic core of the plurality of neurosynaptic cores to at least one additional neurosynaptic core the firing state of the plurality of neurons of the first neurosynaptic core substantially in parallel.

According to embodiments of the present disclosure, a method of and computer program product for simulating a neural network are provided. A plurality of neurosynaptic cores are simulated. The simulated neurosynaptic cores comprise a plurality of simulated axons, a plurality of simulated synapses, and a plurality of simulated neurons. An network is simulated connecting the plurality of simulated neurosynaptic cores. The determination of the firing state of the plurality of simulated neurons of a first of the simulated neurosynaptic cores substantially in parallel is simulated. The delivery of the firing state of the plurality of simulated neurons to at least an additional of the simulated neurosynaptic cores substantially in parallel is simulated.

DETAILED DESCRIPTION

Figure 1:
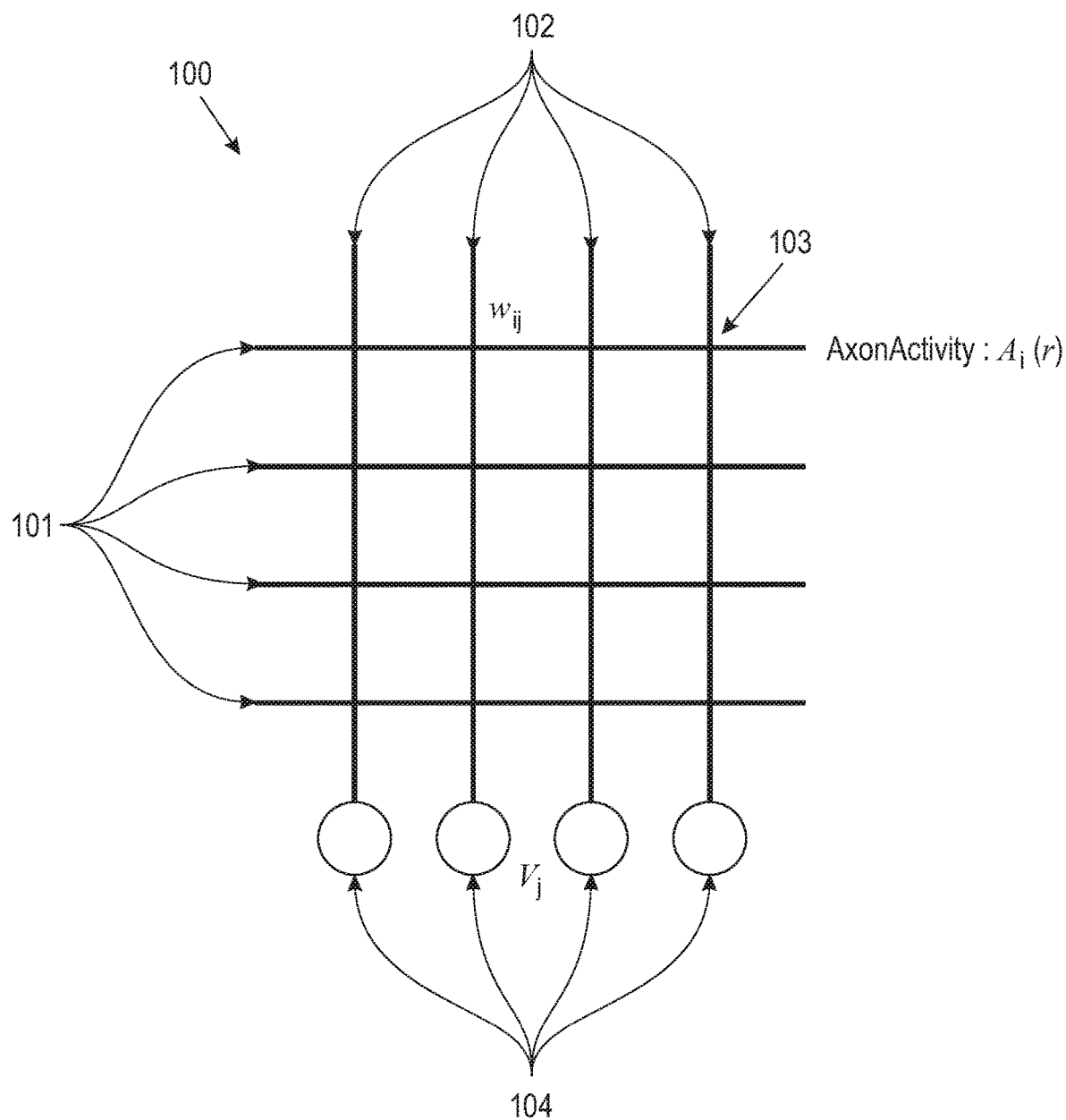
FIG. 1 depicts a neurosynaptic core according to embodiments of the present disclosure.

Arrays of extremely low power neurosynaptic processing units, called neurosynaptic cores, provide an architecture to solve exascale big data problems. These cores use spikes to encode information. In a network of neurosynaptic cores, neurons on each core can connect to any axon of any other neurosynaptic core (including itself). When a neuron spikes, it sends a spike packet that gets delivered to a target axon on a destination core.

In digital spiking neuromorphic systems, information is represented and delivered by spikes, where each spike is a digital packet of information, carrying one or more bits. For example, the IBM TrueNorth chip is a digital spiking neuromorphic system where each spike carries a single bit of information (a binary spike). Spiking neural networks such as TrueNorth are based on delivering packets of information over switched communication wires, thereby significantly reducing the required wiring. The presence of a spike is treated as receiving a 1, its absence represents a 0. More values can be coded into binary spikes using several different spike coding schemas.

A spike communication from a source neuron on a source core, to a target axon on a destination core, would effectively need to traverse certain number of hops via routers in a 2D grid in either the horizontal or vertical or a combination of both to be delivered to the target axon on a destination core. Each hop a spike packet traverses, consumes power and energy.

Within an exemplary neuromorphic system such as TrueNorth, a fixed amount of time is allowed for a spike to travel from its source neuron to its destination axon. This fixed window is referred to as a tick. The time a spike requires for its journey varies based on the distance the spike must travel and the number of 2-D mesh routing, chip and board interfaces that the spike travels across.

On each tick, the neurons in a core are processed sequentially, starting with the first neuron and continuing through the last neuron. Accordingly, in addition to the transmission delays discussed above, each spike is also delayed by some additional fixed amount based on which neuron on a core generated it. For example, in an exemplary neuromorphic system such as TrueNorth having 256 neurons per core, the 256th neuron is not processed until the preceding 255 neurons are processed.

According to various embodiments of the present disclosure, a neurosynaptic program represents a neurosynaptic network. A neurosynaptic program includes information relating to the neurosynaptic network. In some embodiments, the information includes neuronal properties and dynamics that determine an electronic neuron's response to input spikes. For example, neuronal properties and dynamics can include a threshold parameter, a leak parameter, a delay parameter, or a reset parameter. In some embodiments, the neurosynaptic program information includes synaptic connections of the neuron (e.g., synaptic connections made via a synaptic crossbar. In some embodiments, the neurosynaptic program information includes axon properties (e.g., axon types). In some embodiments, the neurosynaptic program information includes one or more destinations (e.g., target axons) that the neuron's output spike should be delivered to.

According to various embodiments, a neurosynaptic network represents an instantiation of a neurosynaptic program. A neurosynaptic network may be instantiated in hardware, in simulation or in both. For example, a neurosynaptic program may give rise to one or more instances of a neurosynaptic network, wherein the instances may reside on a single core, multiple cores, or multiple chips.

According to various embodiments, a neuromorphic core circuit represents an example neurosynaptic network described by a neurosynaptic program.

According to various embodiments, a corelet or a Corelet Programming Language represent software that provide abstraction of neurosynaptic programs. A composition of neurosynaptic programs may be created by composing corelets.

A TrueNorth program is a complete specification of a network of neurosynaptic cores, along with its external inputs and outputs. In various embodiments, a divide-and-conquer approach is adopted whereby a large network of neurosynaptic cores is constructed by interconnecting a set of smaller networks of neurosynaptic cores, where each of the smaller networks, in turn, could be constructed by interconnecting a set of even smaller networks, and so on, down to a network consisting of a single neurosynaptic core, which is the fundamental non-divisible building block. This programming paradigm is referred to as Corelet Programming.

According to embodiments of the present disclosure, neural networks are optimized to approach a theoretical upper bound on throughput while approaching a theoretical lower bound on area and energy. It will be apparent that these three metrics cannot be minimized at the same. However, two may be simultaneously optimized according to the methods set out herein. In particular, while keeping energy consumption (which corresponds to operating cost) and area (which corresponds to equipment cost) as low as possible, the parallelism available in neural networks is exploited to deliver unprecedented throughput.

By delivering capability and throughput with variable speed while minimizing energy consumption and area, the capital, operating, and programming costs are likewise minimized. According to embodiments of the present disclosure, extreme parallelism enables high throughput.

With reference now to FIG. 1, a neurosynaptic core according to embodiments of the present disclosure is depicted. In some embodiments, neurosynaptic core 100 includes axons 101, represented as rows, dendrites 102, represented as columns, synapses 103, represented as row-column junctions, and neurons 104 that receive inputs from dendrites. In some embodiments, there are 256 synapses, 256 axons, and 256 neurons. In such embodiments, there are 256×256=65,536 synapses. Information flows from axons 101 to the neurons 104, modulated by the synapses 103.

Figure 2:
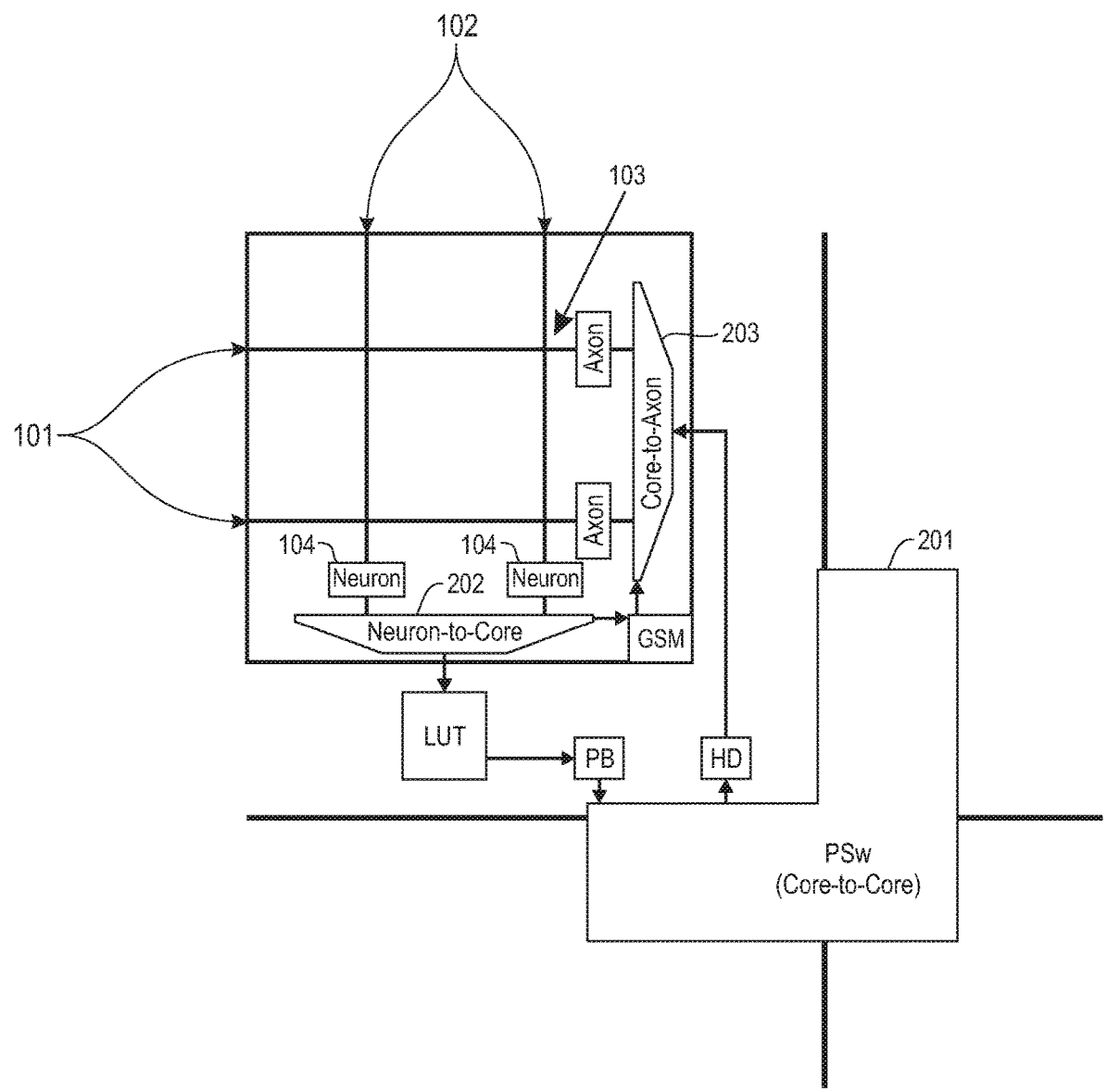
FIG. 2 depicts a neurosynaptic core and mesh router according to embodiments of the present disclosure.

In some embodiments a plurality of neurosynaptic cores are tiled on a chip. In an exemplary embodiments, a 64 by 64 grid of cores is tiled, yielding 4,096 cores, for a total of 1,048,576 neurons and 268,435,456 synapses. In such embodiments, neurons, synapses, and short-distance connectivity are physical. Long-distance connectivity is logical. An exemplary embodiment is depicted in FIG. 2. Mesh router 201 provides communication between cores. Also on a given core, neuron to core 202 and core to axon 203 communication links are provided.

Figure 3:
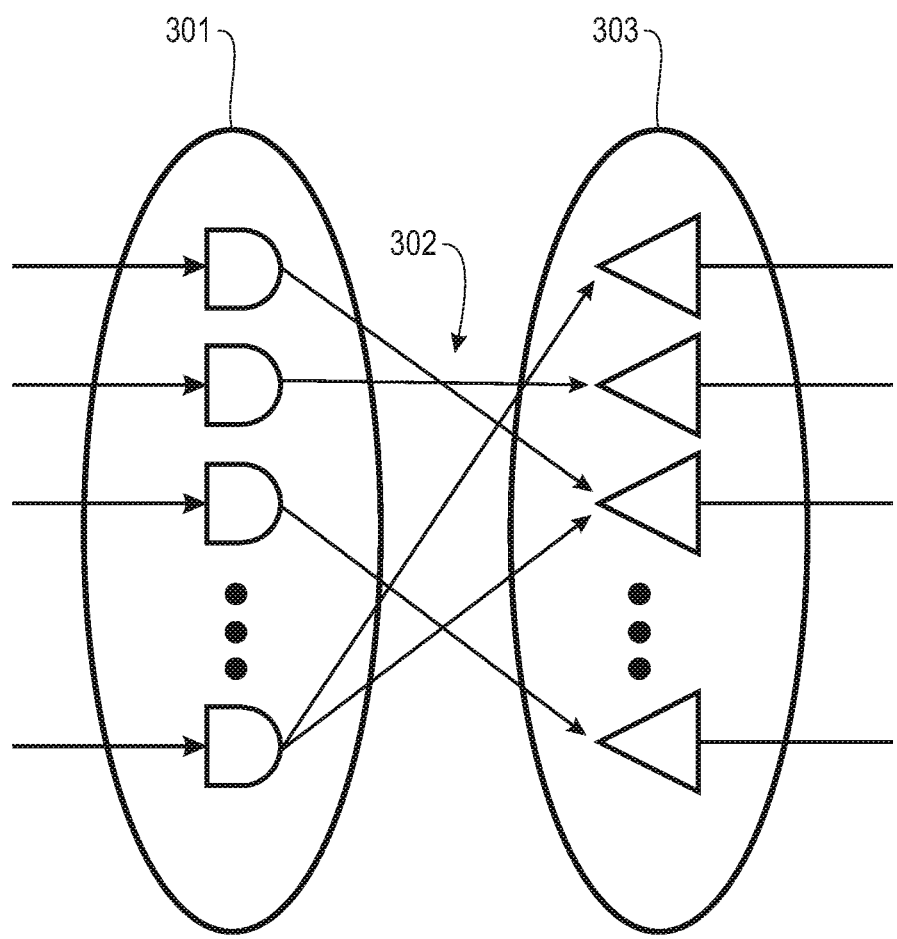
FIG. 3 illustrates the mathematical representation of a neurosynaptic core according to embodiments of the present disclosure.

With reference now to FIG. 3, the mathematical representation of a neurosynaptic core is illustrated. Mathematically, the neurosynaptic core implements a bipartite graph interconnecting axons 301 via synapses 302 to neurons 303. Each input axon can connect to one neuron, all neurons, or any subset thereof. Connections from any set of input axons to any set of neurons can be programmed, creating a flexible and capable neural network module.

According to various embodiments of the present disclosure, new architectures for a neurosynaptic chip is provided. In such architectures, a set of neurosynaptic cores is interconnected by a network-on-chip. In some embodiments, an inter-chip connectivity facility is provided to scale the network.

In some such architectures, within each time step (or tick), the neurons in a core are not processed sequentially. Instead, all neurons in a core operate in parallel on one axon at a time. A vector is constructed that indicates whether each neuron has fired within the tick. Adopting the example from above, the firing state of a core having 256 neurons may be encoded as a 256-dimension binary vector. This firing vector is communicated between neurosynaptic cores. In some embodiments, all neurons are pipelined so that multiple axons can be queued for fast operation.

According to embodiments of the present disclosure, inter-core connectivity may be regarding in terms of permutation. For example, consider C cores, each with N neurons and N axons. The total vector of neuron firing activity is a binary vector of length C×N. This C×N vector is communicated to C×N axons. Thus, it may be thought of as a permutation from C×N neurons to C×N axons. Accordingly, in various embodiments, the network on-chip may be implemented as a permutation network, a Clos network, a butterfly network, a flattened butterfly network, or other networks known in the art.

Figure 4:
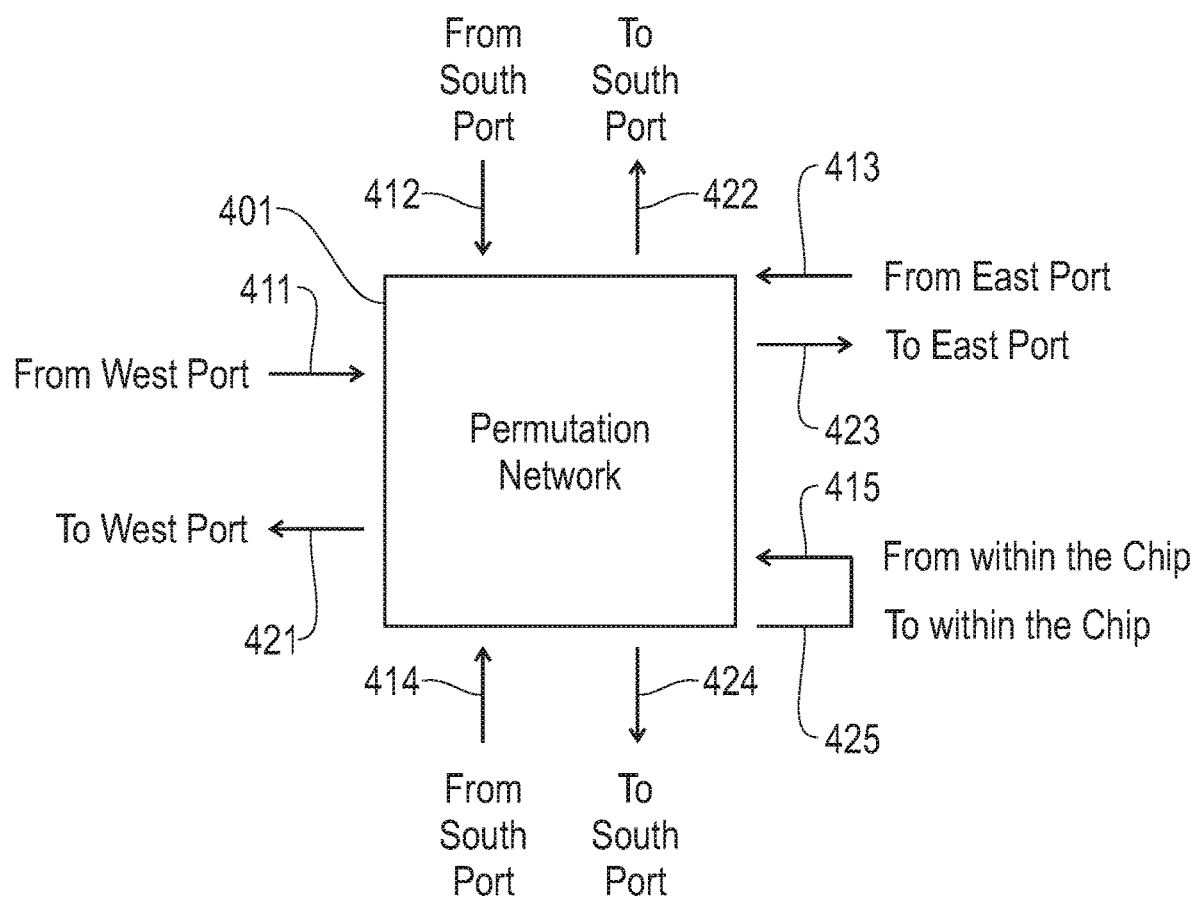
FIG. 4 illustrates an exemplary architecture for inter-chip communication according to embodiments of the present disclosure.

Referring now to FIG. 4, an exemplary architecture for inter-chip communication is illustrated. A given chip 401, implemented as a permutation network as described above, includes five incoming ports 411 . . . 415 and five outgoing ports 421 . . . 425. Thus, the on-chip network receives up to five binary vectors of neuronal firing from West, East, North, and South ports as well as from within the chip. It routes these five binary vectors to up to five destinations West, East, North, and South ports as well as to cores within the chip. It will be appreciated that although in some exemplary embodiments, the cardinal directions are used to describe the layout of chips, the present disclosure is applicable to any chip layout. The present disclosure is also applicable to architectures having more than or less than four adjacent chips. For example, a three-dimensional layout of chips may include up to six adjacent chips, resulting in up to seven incoming and seven outgoing ports.

Embodiments of the present disclosure take advantage of full parallelism of neurons within a core as well as pipelined operation for extremely fast core operation. Each core provides data locality. Communication between cores is provided in a time-bound and parallel fashion for extremely fast network operation, which removes the need to serialize messages in 2D mesh router architectures and exploits parallelism of each core. Combining these two advantages, it is possible to achieve unprecedented throughput in a modular, scalable, and tileable design.

In some embodiments, each neurosynaptic core is time-division multiplexed. In some such embodiments, a factor T is applied to implement T cores with different axons per core interconnecting with different neurons per core via the same synaptic matrix across cores. In such embodiments, each timestep (or tick) is divided into T sub-timesteps. Synchronously, within each sub-timestep t: 0 . . . T−1, each axon is checked for a spike that needs to be delivered. If a spike needs to be delivered, for every neuron $j_t$, its state is updated as a function of synaptic weight $s_{ij}$. For every neuron $j_t$, its new neuron state is computed as a function of its previous state, its parameters, and its input, and then it is checked for a spike. If it has spiked, its destination location is looked up, and a spike packet is generated and sent on the network before neuron $j_t$ is returned to the rest state. Asynchronously, spike packets are received from the network, and axon buffers are updated.

In some embodiments, for each neuron on a given core the same parameters are used, thus decreasing storage. In some embodiments, a synchronous design is employed with clock-gating. In some embodiments with high network complexity, an on-chip network is provided with the largest possible number of input ports m and with C cores. In such embodiments, the number of neuron circuits per core is m/C.

In some embodiments, a network with a 16×16 core array is provided with 64-way time-multiplexing. However, in various other embodiments, the number of cores is selected such that overhead due to networking does not overwhelm computation. In general, the speed of a given network will be bottlenecked or limited by the length of the longest wire. Likewise, the speed of the network will be limited by the speed of the interfaces at various ports. Thus, the difference in speed between off-chip and on-chip networks may become a bottleneck.

As will be appreciated from the above description, according to embodiments of the present disclosure, an axonal approach is adopted in place of a dendritic approach. It will be appreciated that shifting from mesh routing to permutation networks allows asynchronous circuits to be replaced with clock-gated synchronous circuits. In this way, the time and effort of development is reduced. The ease of integration and subsequent revisions makes such embodiments substantially simpler.

Figure 5:
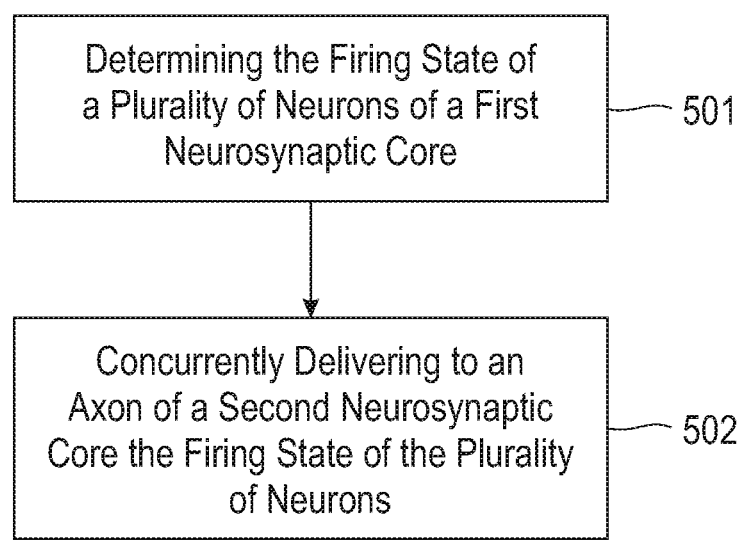
FIG. 5 illustrates an exemplary method for operating a neurosynaptic network according to embodiments of the present disclosure.

Referring now to FIG. 5, an exemplary method for operating a neurosynaptic network according to embodiments of the present disclosure is illustrated. At 501, the firing state of a plurality of neurons of a first neurosynaptic core is determined. In some embodiments, the firing states are determined substantially in parallel. At 502, the firing state of the plurality of neurons is delivered to at least one additional neurosynaptic core. In some embodiments, the firing states are delivered substantially in parallel. In some embodiments, the firing states are delivered via an intra-chip network.

Figure 6:
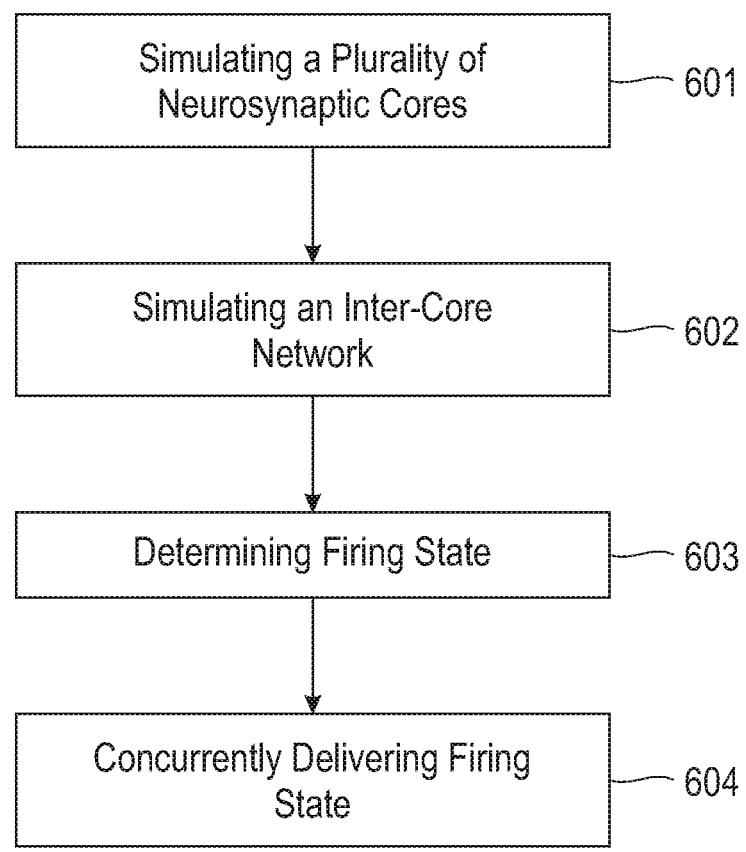
FIG. 6 illustrates an exemplary method for simulating a neurosynaptic network according to embodiments of the present disclosure.

Referring now to FIG. 6, an exemplary method for simulating a neurosynaptic network according to embodiments of the present disclosure is illustrated. At 601, A plurality of neurosynaptic cores are simulated. In some embodiments, the simulated neurosynaptic cores comprise a plurality of simulated axons and a plurality of simulated neurons. At 602, An inter-core network is simulated connecting the plurality of simulated neurosynaptic cores. At 603, The firing state of the plurality of simulated neurons of a first of the simulated neurosynaptic cores is determined. In some embodiments, the firing states are determined substantially in parallel. At 604, The firing state of the plurality of simulated neurons is delivered to at least one additional of the simulated neurosynaptic cores. In some embodiments, the firing states are delivered substantially in parallel. In some embodiments, the firing states are delivered via an intra-chip network.

Figure 7A:
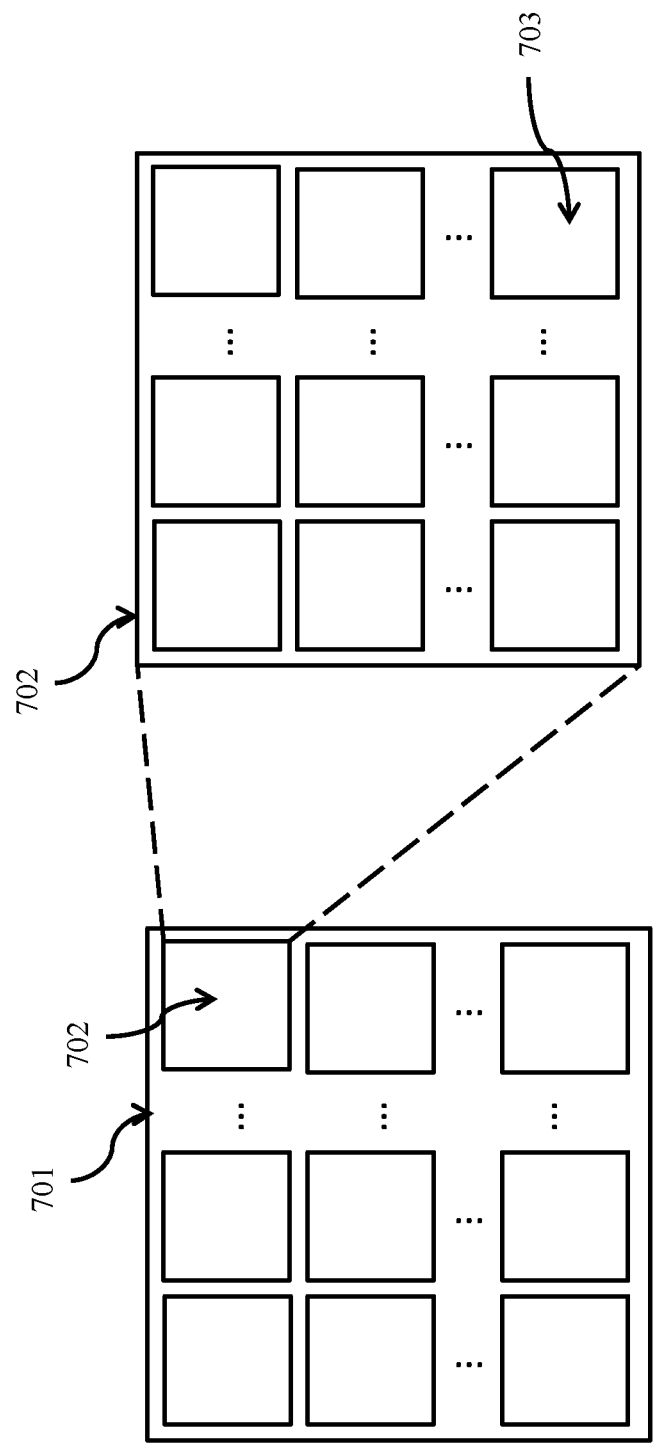
FIGS. 7A-B illustrate an exemplary layout of a neuromorphic system according to embodiments of the present disclosure.
Figure 7B:
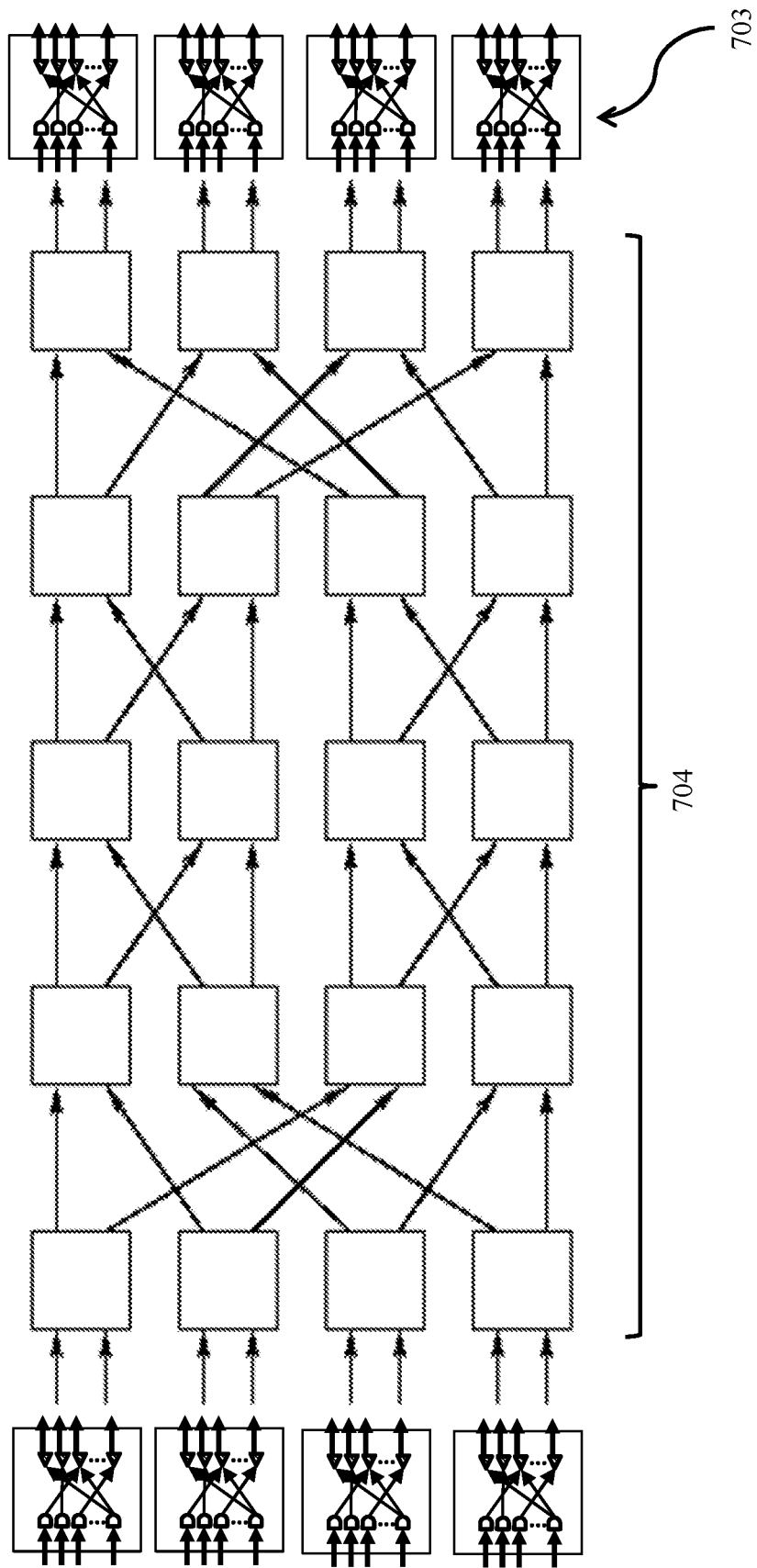

Referring to FIG. 7, an exemplary layout of a neuromorphic system according to embodiments of the present disclosure is illustrated. A board 701 includes a plurality of chips such as chip 702. Each chip, such as chip 702, includes a plurality of cores, such as cores 703. Each core, such as core 703, is connected by network 704, which may be a permutation network as set forth above.

Figure 8:
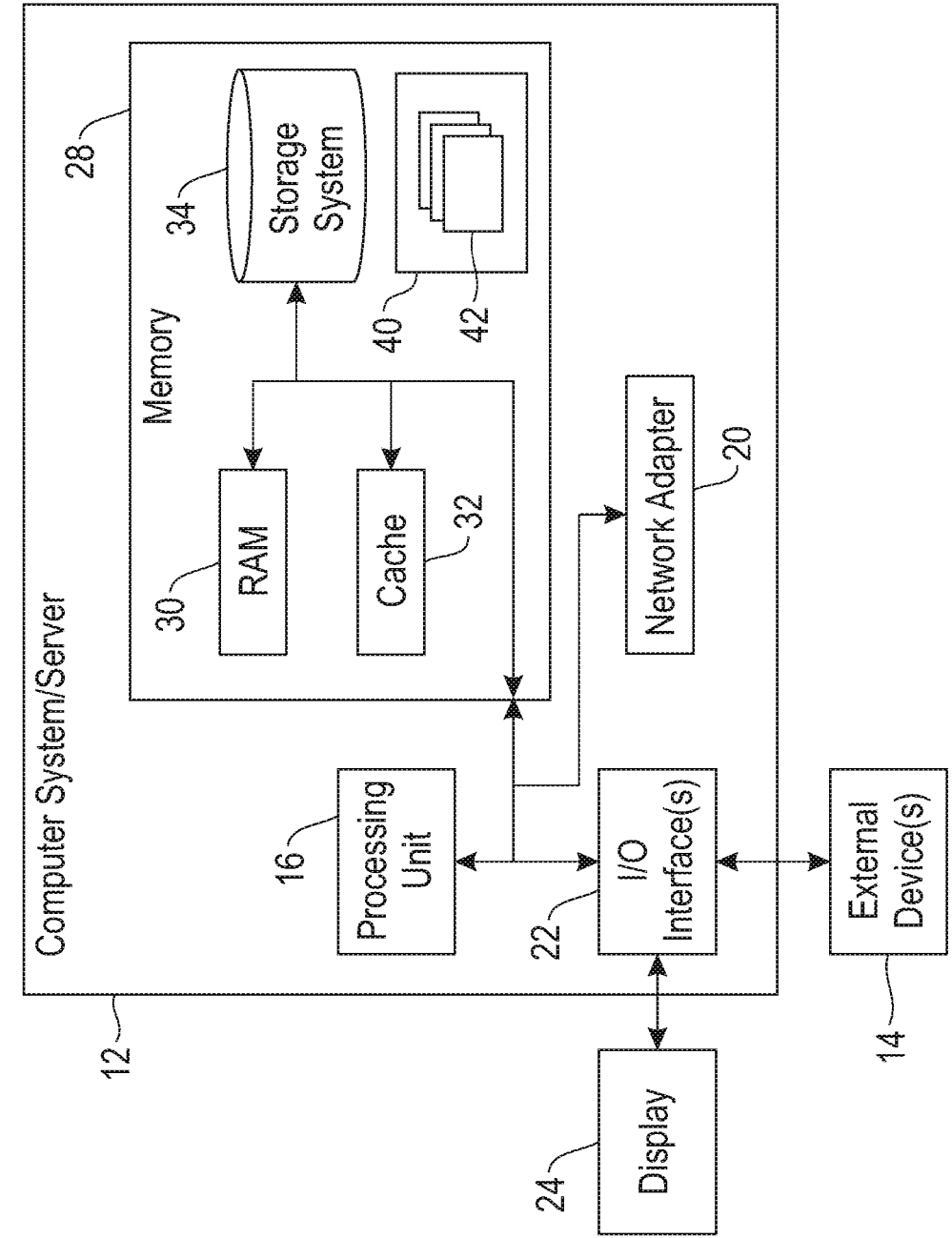
FIG. 8 depicts a computing node according to an embodiment of the present invention.

Referring now to FIG. 8, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    determining, during each of a plurality of time steps, a firing state of a plurality of neurons of a first neurosynaptic core in parallel, the first neurosynaptic core comprising a plurality of axons and being time-division multiplexed, and wherein
    said determining comprises:
        operating, within the first neurosynaptic core, all of the plurality of neurons in parallel on the plurality of axons, one axon at a time, to construct a binary vector corresponding to the firing state of the plurality of neurons within a current time step of the plurality of time steps,
        dividing the current time step into a plurality of sub-timesteps,
        within each sub-timestep, synchronously checking each of the plurality of axons for a spike to be delivered, and
        in response to the checking, determining that one or more spikes need to be delivered and updating the firing state of the plurality of neurons in parallel; and delivering, during each of the plurality of time steps, to a plurality of additional neurosynaptic cores on a plurality of chips, the firing state of the plurality of neurons in parallel, by transmitting the binary vector to each of the plurality of chips for delivery to axons of each of the plurality of additional neurosynaptic cores.

2. The method of claim 1, wherein the first neurosynaptic core and the plurality of additional neurosynaptic cores are located on a first chip.

3. The method of claim 2, wherein the parallel delivery is via an inter-core network.

4. The method of claim 3, wherein the parallel delivery is performed by a permutation network, a Clos network, or a butterfly network.

5. The method of claim 1, further comprising:
    pipelining the firing state of the plurality of neurons.

6. The method of claim 1, wherein the first neurosynaptic core is located on a first chip, and the plurality of additional neurosynaptic cores is located on a second chip.

7. The method of claim 6, further comprising:
    transmitting the firing state of the plurality of neurons via an inter-chip network connecting the first chip and the second chip.

8. The method of claim 7, wherein the inter-chip network comprises an outgoing port of the first chip and an incoming port of the second chip.

9. The method of claim 7, wherein the inter-chip network comprises an outgoing port of the first chip connected to an incoming port of the first chip.

10. The method of claim 6, wherein the first and second chip are located on a first board.

11. The method of claim 6, wherein the first chip is located on a first board and the second chip is located on a second board, the first and second boards being connected.

12. The method of claim 11, wherein a plurality of boards comprising the first board and the second board is hierarchically arranged, and wherein the first board and the second board are connected via a hierarchy of routers.

13. A system comprising:
    a plurality of neurosynaptic cores, the neurosynaptic cores comprising a plurality of axons, a plurality of synapses, and a plurality of neurons and being time-division multiplexed; and
    a first inter-core network connecting the plurality of neurosynaptic cores, wherein
    each of the plurality of neurosynaptic cores is adapted to determine, during each of a plurality of time steps, a firing state of its plurality of neurons, said determining comprising:
        operating, within that neurosynaptic core, all of its plurality of neurons in parallel on its plurality of axons, one axon at a time, to construct a binary vector corresponding to the firing state of its plurality of neurons within a current time step of the plurality of time steps,
        dividing the current time step into a plurality of sub-timesteps,
        within each sub-timestep, synchronously checking each of its plurality of axons for a spike to be delivered, and
        in response to the checking, determining that one or more spikes need to be delivered and updating the firing state of the plurality of neurons in parallel, and
    the first inter-core network is adapted to deliver, during each of the plurality of time steps, from a first neurosynaptic core of the plurality of neurosynaptic cores to a plurality of additional neurosynaptic cores on a plurality of chips the firing state of the plurality of neurons of the first neurosynaptic core in parallel, by transmitting the binary vector to each of the plurality of chips for delivery to axons of each of the plurality of additional neurosynaptic cores.

14. The system of claim 13, wherein the inter-core network comprises a permutation network, a Clos network, or a butterfly network.

15. The system of claim 13, wherein the first inter-core network is located on a first chip and a second inter-core network is located on a second chip, the plurality of additional neurosynaptic cores being connected to the second inter-core network.

16. The system of claim 15, wherein the first chip and the second chip are adjacent.

17. The system of claim 15, further comprising:
a port connecting the first inter-core network to the second inter-core network.

18. The system of claim 15, wherein the first and second chip are located on a first board.

19. The system of claim 15, wherein the first chip is located on a first board and the second chip is located on a second board, the first and second boards being connected.

20. The system of claim 19, wherein a plurality of boards comprising the first board and the second board is hierarchically arranged, and wherein the first board and the second board are connected via a hierarchy of routers.

21. The system of claim 13, further comprising:
a port connecting the first inter-core network to itself.

22. A computer program product for operating a neurosynaptic network, the computer program product comprising a computer readable storage medium having program instructions embodied therewith, the program instructions executable by a processor to cause the processor to perform a method comprising:
determining, during each of a plurality of time steps, a firing state of a plurality of neurons of a first neurosynaptic core in parallel, the first neurosynaptic core comprising a plurality of axons and being time-division multiplexed, and wherein
said determining comprises:
operating, within the first neurosynaptic core, all of the plurality of neurons in parallel on the plurality of axons, one axon at a time, to construct a binary vector corresponding to the firing state of the plurality of neurons within a current time step of the plurality of time steps,
dividing the current time step into a plurality of sub-timesteps,
within each sub-timestep, synchronously checking each of the plurality of axons for a spike to be delivered, and
in response to the checking, determining that one or more spikes need to be delivered and updating the firing state of the plurality of neurons in parallel; and
delivering, during each of the plurality of time steps, to a plurality of additional neurosynaptic cores on a plurality of chips, the firing state of the plurality of neurons in parallel, by transmitting the binary vector to each of the plurality of chips for delivery to axons of each of the plurality of additional neurosynaptic cores.

* * * * *